United States Patent [19]

Shiba et al.

[11] Patent Number: 5,187,756
[45] Date of Patent: Feb. 16, 1993

[54] SURFACE ACOUSTIC WAVEGUIDE DEVICE AND MANUFACTURING METHOD

[75] Inventors: Masataka Shiba; Akira Inagaki; Minoru Yoshida; Kenchi Ito; Kazumi Kawamoto, all of Yokohama, Japan

[73] Assignee: Hitachi, Ltd., Tokyo, Japan

[21] Appl. No.: 758,608

[22] Filed: Sep. 12, 1991

[30] Foreign Application Priority Data

Sep. 12, 1990 [JP] Japan .................. 2-239908

[51] Int. Cl.$^5$ .............................. G02B 6/10
[52] U.S. Cl. ....................... 385/7; 385/129; 385/147
[58] Field of Search .......... 385/7, 129, 130, 4, 385/147

[56] References Cited

U.S. PATENT DOCUMENTS

| | | | |
|---|---|---|---|
| 3,655,261 | 4/1972 | Chang | 350/96 WG |
| 4,182,543 | 1/1980 | Wied et al. | 385/7 |
| 4,548,464 | 10/1985 | Auracher et al. | 385/7 |
| 5,076,654 | 12/1991 | Presby | 385/129 |

FOREIGN PATENT DOCUMENTS 62-173814 7/1987 Japan .
1-213018 8/1989 Japan .

OTHER PUBLICATIONS

Efficient Acoustooptical Coupling of Guided to Substrate Modes in a Combined Acoustical/Optical Channel Guide, IEEE Proc., IGWO 1989 pp. 138-141.
Waveguide Optical Deflector for an Optical Disk Tracking Actuator using a Surface Acoustic Wave Device, Applied Optics, vol. 29, No. 2, 1990.

Primary Examiner—John D. Lee
Assistant Examiner—S. Barns
Attorney, Agent, or Firm—Antonelli, Terry, Stout & Kraus

[57] ABSTRACT

The present invention relates to a surface acoustic wave element comprising a substrate, an optical waveguide layer formed on the aforesaid substrate to guide laser light from a laser light source, a surface acoustic wave portion for deflecting or modulating the laser light traveling through the aforesaid optical waveguide layer, a comb-shaped SAW electrode provided on the aforesaid optical waveguide layer to cause the aforesaid surface acoustic wave portion to generate surface acoustic wave, and a terminal provided on the aforesaid optical waveguide layer and connected to the aforesaid SAW electrode to apply a high-frequency alternating voltage thereto, wherein a protection cover is bonded by a viscoelastic adhesive having a refractive index smaller than that of the aforesaid optical waveguide layer to cover the aforesaid SAW electrode and surface acoustic wave portion with air space in such a manner that the aforesaid terminal is positioned outside thereof, and the manufacturing method of the surface acoustic wave element.

11 Claims, 4 Drawing Sheets

SURFACE ACOUSTIC WAVEGUIDE DEVICE AND MANUFACTURING METHOD

BACKGROUND OF THE INVENTION

The present invention relates to an optical waveguide device fabricated by forming an acoustic surface wave light deflection or light modulation element on an optical waveguide substrate and a manufacturing method of surface acoustic wave element. In an integrated optics constituting a lens, optical switch, and other optical elements on an optical waveguide substrate, the various applications of an acoustic surface wave (SAW: Surface Acoustic Wave) light deflection element or SAW light modulation element using acousto-optic effect are in progress as a typical active element. Hereinafter, the SAW light deflection element and SAW light modulation element are collectively referred to as SAW element.

As to the above-mentioned SAW element, there have been discussions made public in "Integrated Optics" by Hiroshi Nishiyama et al published by Ohm Inc. in Japan (1983), pp. 118-126, pp. 320-335, pp. 361-369, and IEEE Proc. IGWO '89 (1989), pp. 138-141, for example, and it is possible to perform deflection of light, and modulation of intensity and frequency by affecting light traveling in the optical waveguide in the form of collinear or coplaner.

FIG. 7 is a view showing a covnentional SAW element. On a substrate 1 of lithium niobate or others, a thin optical waveguide layer 2 having a refractive index higher than the substrate is formed by ion exchange process or the like. Then, an incident laser light 9 is guided into this waveguide 2. Meanwhile, when a high-frequency alternating voltage 5 is applied to a comb-shaped SAW electrode 3 through a terminal 4, an surface acoustic wave (SAW) 6, the refractive index and displacement of the SAW element of which change periodically, is generated. If the incident laser light 9 is irradiated onto this SAW 6, the SAW 6 functions as a diffraction grating to change the frequency of the high-frequency alternating voltage 5; thus making it possible to perform the deflection, modulation, and the like for the emitting laser light 10. A reference numeral 7 in FIG. 7 designates an absorbent which terminates the propagation of the SAW 6. FIG. 8 is a view illustrating the state of propagation of SAW 6. The above-mentioned SAW is a wave 30 traveling on the surface of the optical waveguide. The crystal grating 32 on the optical waveguide element represents a locus of motion such as designated by a numeral 31 within the depth substantially equal to the wavelength Λ of the traveling wave 30 at the time of SAW propagation.

In this respect, the wavelength Λ of the traveling wave 30 is expressed by an equation (1) given below.

$$\Lambda = v/f \quad (1)$$

where f is the frequency of the high-frequency alternating voltage 5 applied to the SAW electrode 3 shown in FIG. 7, and v is the sound velocity on the optical waveguide 2.

In the above-mentioned conventional technique, there is a problem that no protection for the surface layer is considered in spite of the fact that the SAW is a phenomenon which appears on the surface layer of the optical waveguide.

SUMMARY OF THE INVENTION

With a view to solving the above-mentioned problem, an object of the present invention is to provide a guided wave optical device capable of displaying the characteristics of an SAW element always sufficiently by preventing the adhesion of foreign particle or the generation of scratch. Also, a further object of the present invention is to provide a protection method of surface acoustic wave (SAW) to cover the drawback of the SAW element such that it is susceptible to foreign particle adhering thereto or scratch generated thereon during its assembly or in a state of being packaged to the device.

In other words, in order to achieve the above-mentioned objects, the present invention is designed to cover the electrode which is susceptible to foreign particle or scratch and the portion where the SAW travels with a protecting cover having a space which does not hinder the traveling of the SAW, and to use an adhesive having a viscous elasticity so as not to add reflection or some other disturbances to the traveling SAW.

Specifically, a flat box shaped protection cover having a concave portion in the center thereof is provided. With the aforesaid concave portion of the protection cover, the portion where the surface acoustic wave travels and the comb-shaped electrode are covered, and the aforesaid protection cover is bonded to the surface acoustic element by the viscoelastic adhesive which has smaller refractive index than that of the above-mentioned optical waveguide in such a manner that the terminal is positioned outside the protection cover.

As the above describes, by installing the protection cover immediately after the SAW electrode has been formed, it is possible to achieve the object to prevent the adhesion of foreign particle or the generation of scratch when the SAW element is cut, polished, handled, bonded, and packaged onto the device.

As described earlier, if the flat box shaped protection cover with a concave portion formed in the center thereof is prepared and bonded to the SAW element by an adhesive having a viscous elasticity so that the aforesaid concave portion provides a space for the SAW electrode and the portion for SAW to travel without any hindrance for the generation of SAW and the traveling thereof, it is possible to prevent the adhesion of any foreign particle and scratch to the SAW electrode and the portion for SAW to travel when the SAW element is assembled or packaged. As a result, as shown in FIG. 7 or FIG. 8, it is possible to prevent the existence of any foreign particle 8 or scratch in the traveling path of the SAW 6, and the propagation of the SAW 6 is not interrupted at such portion to display always the characteristics as an SAW. Further, any generation of scratches in the comb-shaped SAW electrode 3 is prevented; thus making it possible to maintain the generation of the SAW 6 at all times because any possible wire breakage or short circuit in the SAW electrode 3 can be prevented.

Also, by using an adhesive having a viscous elasticity for bonding the protection cover, it is possible to eliminate the reflection of the SAW resulting from the protection cover because such adhesive serves as an SAW absorber.

Furthermore, by making the refractive index of the above-mentioned viscoelastic adhesive smaller than that of the optical waveguide, it is possible to control the leakage or scattering of the traveling laser light to be small in the optical waveguide where the above-mentioned adhesive is in contact therewith.

DETAILED DESCRIPTION OF THE PREFERRED EMBODIMENTS

Figure 1:
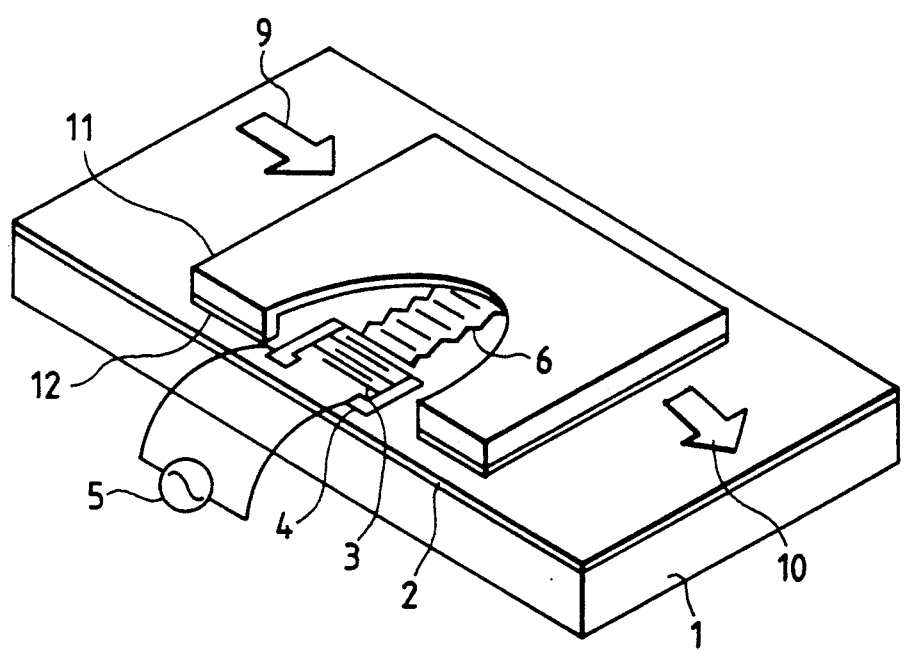
FIG. 1 is a perspective view showing a first embodiment of the optical waveguide device provided with a surface acoustic wave protection according to the present invention.
Figure 2:
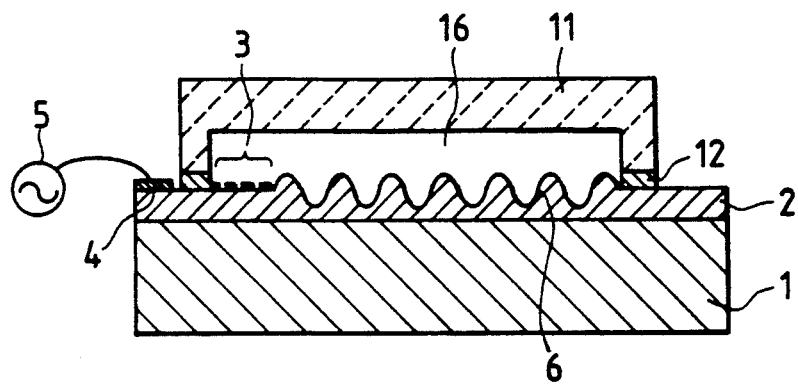
FIG. 2 is a cross-sectional view showing a protection cover at the time of its installation in the above-mentioned embodiment.
Figure 3:
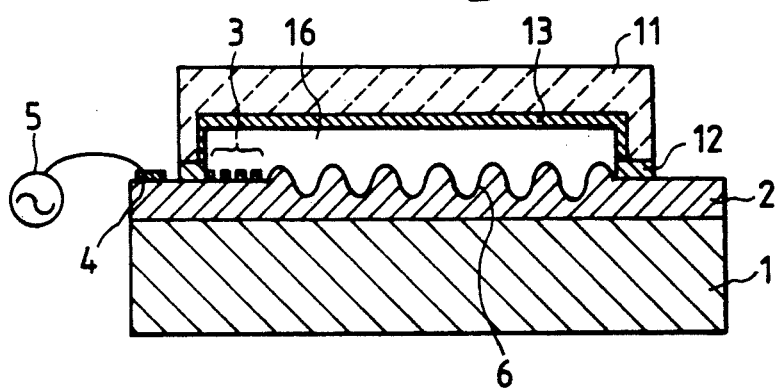
FIG. 3 is a cross-sectional view showing a variation of the above-mentioned first embodiment.
Figure 4:
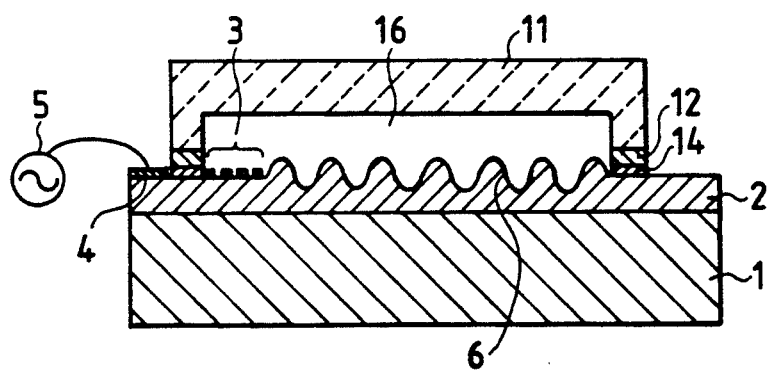
FIG. 4 is a cross-sectional view showing a second embodiment according to the present invention.
Figure 5:
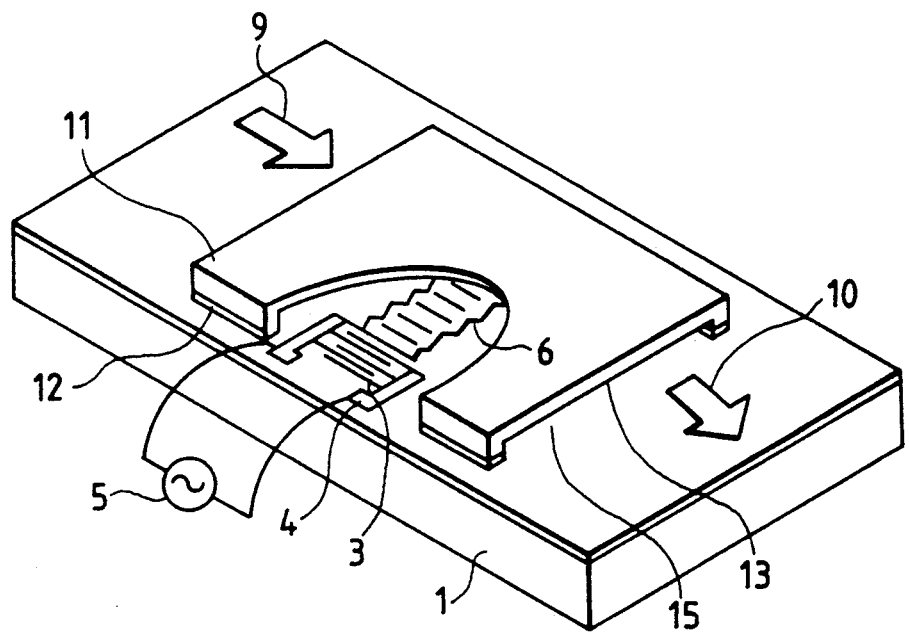
FIG. 5 is a perspective view showing a third embodiment according to the present invention.
Figure 6:
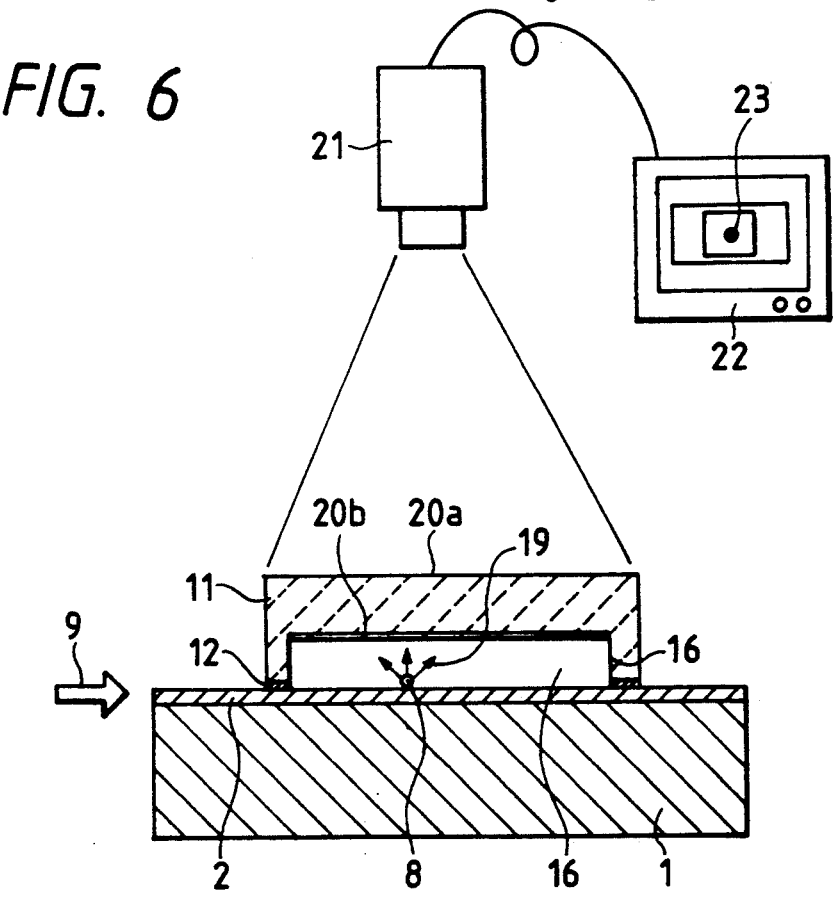
FIG. 6 is a side view illustrating another effect of the present invention.
Figure 7:
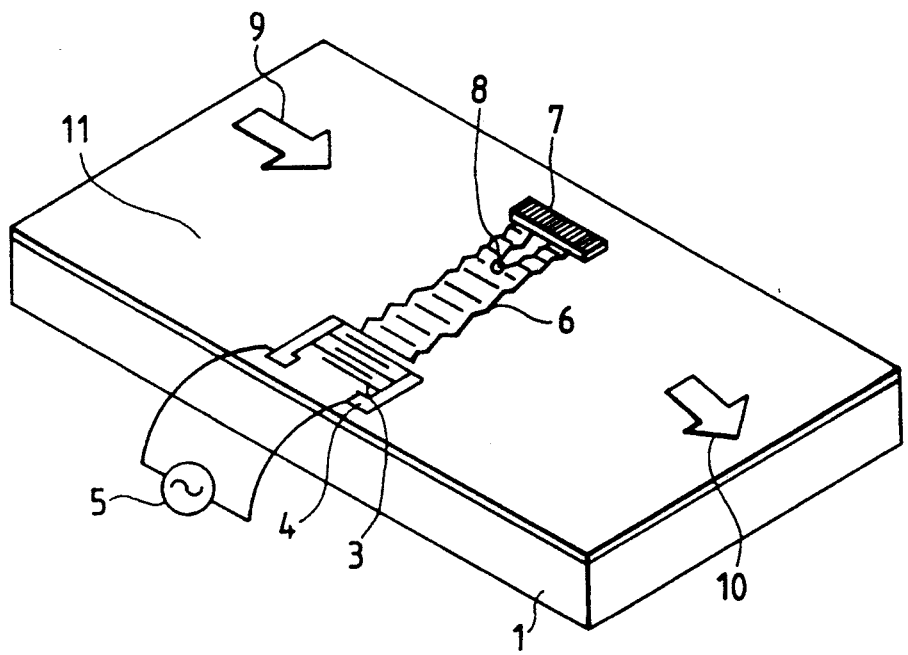
FIG. 7 is a perspective view showing a conventional SAW element.
Figure 8:
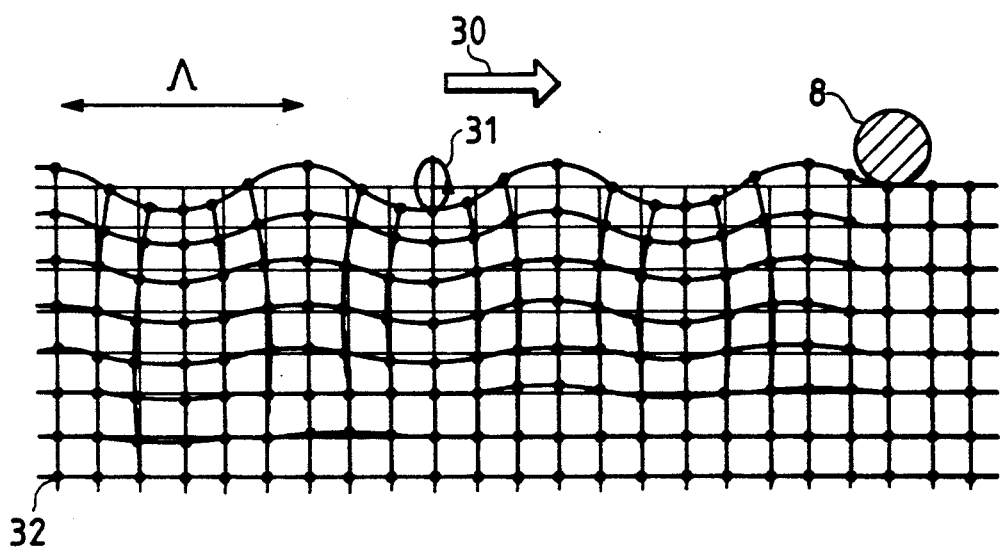
FIG. 8 is a schematic view illustrating the principle of the SAW.

Subsequently, in conjunction of the accompanying drawings, the embodiments of the present invention will be described. FIG. 1 is a perspective view showing a first embodiment of the surface acoustic wave protection method, FIG. 2 is a cross-sectional view showing a protection cover at the time of its installation in the above-mentioned embodiment, FIG. 3 is a cross-sectional view showing a variation of the above-mentioned first embodiment, FIG. 4 is a cross-sectional view showing a second embodiment according to the present invention, FIG. 5 is a perspective view showing a third embodiment according to the present invention, and FIG. 6 is a side view illustrating another effect of the present invention. In FIG. 1, on the substrate 1 of lithium niobate and others, a thin layer 2 having a higher refractive index than that of the above-mentioned substrate is formed as an optical waveguide by ion exchange process or the like. Further, on the optical waveguide 2, a terminal 4 and a comb-shaped SAW electrode 3 are provided, and SAW is generated in the SAW generation portion 6 by applying a high-frequency alternative voltage 5. An SAW element is then formed which deflects or modulates laser beam 10 when an incident laser light 9 is affected by the above-mentioned SAW 6 in the form of collinear or coplaner. A protection cover 11 formed of glass, plastics, ceramics, metal, or the like is bonded to the SAW element with a viscoelastic adhesive 12 having a smaller refractive index than that of the optical waveguide 2. FIG. 2 is illustrated the sectional state of the above-mentioned protection cover 11 when it is bonded. Here, by placing the SAW electrode 3 and the SAW traveling portion 6 in the space 16 formed by the central concavity of the protection cover 11, the generation and traveling of the SAW are not hindered. In addition, by the adhesive 12 coated over the above-mentioned protection cover 11 and the circumference of the above-mentioned concavity, these portions are insulated from the outside so as to prevent any foreign particle and scratch as shown in FIG. 7 or FIG. 8 from adhering to the optical waveguide 2 in the protection cover 11. Also, the terminal 4 which induces the high-frequency alternating voltage 5 to the SAW electrode 3 is placed outside the protection cover 11; thus making it easy to execute the bonding work and at the same time, to prevent any possible accident that may damage the SAW electrode 3 while the bonding work. The adhesive 12 has a viscous elasticity to serve as an SAW absorber to terminate the propagation of the SAW 6, and enables to restrict the reflection of the SAW 6 which is generated when a hard adhesive is used. Also, the adhesive 12 is a material which has a lower refractive index than the optical waveguide 2. As a result, even if the adhesive is in contact with the traveling portion of the incident and emitting laser light 9 and 10 as shown in FIG. 1, the leakage or scattering of light from such portion is small, and there is almost no effect caused thereby. In this respect, the protection cover 11 is partially cut away in FIG. 1 in order to clearly represent the SAW electrode 3 and SAW traveling portion 6.

FIG. 3 is a cross-sectional view showing an embodiment of a variation of the first embodiment. As in the first embodiment shown in FIG. 1, the protection cover 11 is bonded to the SAW element. At this juncture, if any foreign particle is floating in the space 16 which is in contact with the SAW electrode 3 and the SAW traveling portion, these particle may sometimes drop onto the optical waveguide 2 as the time elapses. In order to prevent this to occur, a viscoelastic material 13 is coated over the inner wall of the protection cover 11 to catch the above-mentioned floating foreign particle.

For a second embodiment of the present invention shown in FIG. 4, the adhesive 12 is coated over the protection cover 11 beforehand as a method to make the bonding work of the protection cover easier in the first embodiment for the prevention of any possible accident when the bonding is executed. However, there is some case where the incident and emitting laser light 9 and 10 are slightly scattered because with this method, the adhesive 12 and the optical waveguide 2 are not completely in contact with each other. If this scattering may cause some problem, a thin layer 14 made of a photoresist material having a low refractive index or the like should be formed on the optical waveguide 2 as shown in FIG. 4. By bonding the protection cover 11 to the above-mentioned thin layer 14 with the adhesive 12, it is possible to obtain the effect as an SAW absorber for the SAW 6 by the above-mentioned adhesive 12 as well as the preventive effect against the scattering of the incident and emitting laser light by the photoresist thin layer 14.

A third embodiment of the present invention shown in FIG. 5 is substantially of the same structure as the first embodiment. However, the method adopted here is such that on both sides of the protection cover 11, openings 15 are provided in the direction at right angles to the traveling direction of the SAW and in the direction which does not hinder the traveling of the incident and emitting laser light 9 and 10. In this case, it is possible to arrange its structure such that the openings 15 are made sufficiently small to prevent any ingression of foreign particle and at the same time, to coat the inner wall of the protection cover 11 with the material 13 having a viscous elasticity to catch any possible foreign particle that may have ingressed thereinto as in the case of an embodiment shown in FIG. 3.

FIG. 6 shows another effect when the protection cover 11 according to the present invention is made of glass, plastics, or other light transmitting materials. Such effect will be described on the basis of the first embodiment. A laser light 9 is inputted into the optical waveguide 2. At this juncture, if there is any foreign particle 8 or scratch on the optical waveguide in the protection cover 11, scattering rays of light 19 are generated. If the protectional cover 11 is made of a light transmitting material, the above-mentioned scattering rays of light 19 are detected by a television camera 21; thus making it possible to check easily the existence of the foreign particle or scratch by a luminescent spot 23 on the screen of a monitor 22. In this respect, depending on the material used for forming the protection cover 11, it may sometimes be required to apply an antireflection coating, antistatic or dielectric coating to the outer and inner faces 20a and 20b of the protection cover 11.

In the embodiments shown in FIG. 1 through FIG. 6, while an SAW element forming a optical waveguide on a substrate of lithium niobate is examplified, the element may also be provided with an optical waveguide formed on some other substrate such as made of Si, GaAs, or the like. Also, as the material of the protection cover, glass, plastics, ceramics, or metal such as aluminum may be used, but it is important to use a material which can be cleaned with ease.

Further, in stead of the adhesive having the viscous elasticity, an adhesive double-coated tape may be utilized. Also, the SAW absorber may be provided independent of the adhesive for the protection cover.

As the above describes, according to the present invention, the surface acoustic wave element 6 is provided with an optical waveguide 2, a comb-shaped electrode 3, and a terminal 4, and a high-frequency voltage 5 is applied through the terminal 4 to cause the above-mentioned toothed electrode to generate SAW; hence enabling the above-mentioned SAW to deflect or modulate laser light traveling in the optical waveguide 2. Then, in order to protect such element, a flat box shaped protection cover 11 having a concavity in the central portion thereof is provided to cover the traveling portion of SAW 6 and the comb-shaped electrode 3 with such concavity of the above-mentioned protection cover 11, and by bonding the above-mentioned protection cover 11 to the surface acoustic wave element with a viscoelastic adhesive 12 having a refractive index smaller than that of the above-mentioned optical waveguide 2 in such a manner that the above-mentioned terminal 4 is placed outside the protection cover 11, it becomes possible to prevent the adhesion of any foreign particle and scratch to the SAW element in a usual use and further, it is possible to prevent any accident that may occur during the bonding work on the SAW electrode terminal or an SAW element assembly. As a result, there are significant effects on the improvement of the stability and life of the above-mentioned SAW element, and the improvement of the manufacturing yield thereof. Furthermore, if a light transmitting material is used to form the material for the above-mentioned protection cover 11, an inspection for foreign particle on the optical waveguide 2 is possible even in a state where the protection cover is installed. By this inspection it is possible to further improve the manufacturing yield.

What is claimed is:

1. A surface acoustic wave element comprising:
   a substrate;
   an optical waveguide layer formed on said substrate for guiding laser light from a laser light source;
   a surface acoustic wave portion for deflecting or modulating the laser light traveling through said optical waveguide layer;
   a comb-shaped SAW electrode provided on said optical waveguide layer to generate surface acoustic wave in the said surface acoustic wave portion; and
   a terminal provided on said optical waveguide layer and connected to said SAW electrode to apply a high-frequency alternating voltage thereto, wherein
   a protection cover is bonded by a viscoelastic adhesive having a refractive index smaller than that of said optical waveguide to cover said SAW electrode and surface acoustic wave portion with air space in such a manner that said terminal is placed outside thereof.

2. A surface acoustic wave element according to claim 1, wherein a thin viscoelastic layer is formed on an inner concave wall of said protection cover so as to catch floating foreign particles.

3. A surface acoustic wave element according to claim 1, wherein said protection cover is formed of a light transmitting material.

4. A surface acoustic wave element according to claim 1, wherein a fine space is formed between said protection cover and the surface of the optical waveguide where the laser light travels.

5. A surface acoustic wave element according to claim 1, wherein said adhesive serves as an SAW absorber which terminates the propagation of the SAW.

6. A surface acoustic wave element comprising:
   a substrate;
   an optical waveguide layer formed on said substrate for guiding laser light from a laser light source;
   a surface acoustic wave portion for deflecting or modulating the laser light traveling through said optical waveguide layer;
   a comb-shaped SAW electrode provided on said optical waveguide to generate surface acoustic wave in the said surface acoustic wave portion;
   a terminal provided on said optical waveguide layer and connected to said SAW electrode to apply a high-frequency alternating voltage thereto; and
   a thin layer having a refractive index smaller than that of said optical waveguide and formed partially on said optical waveguide layer, wherein
   a protection cover is bonded to said thin layer by an adhesive having a refractive index smaller than that of said optical waveguide layer and viscous elasticity to cover said SAW electrode and surface acoustic wave portion with the space thereof in such a manner that said terminal is placed outside thereof.

7. A surface acoustic wave element according to claim 6, wherein a thin viscoelastic layer is formed on an inner concave wall of said protection cover so as to catch floating foreign particles.

8. A surface acoustic wave element according to claim 6, wherein said protection cover is formed of a light transmitting material.

9. A surface acoustic wave element according to claim 6, wherein a fine space is formed between said protection cover and the surface of the optical waveguide where the laser light travels.

10. A surface acoustic wave element according to claim 6, wherein said adhesive serves as an SAW absorber which terminates the propagation of the SAW.

11. A manufacturing method for a surface acoustic wave element comprising the steps of
    forming an optical waveguide layer on a substrate to guide laser light from a laser light source;

forming a comb-shaped SAW electrode to generate surface acoustic wave in a surface acoustic wave generating portion and a terminal to apply a high-frequency alternating voltage on said optical waveguide layer;

bonding a protection cover with a viscoelastic adhesive having a refractive index smaller than the that of said optical waveguide layer so as to enclose said SAW electrode and surface acoustic wave portion with air space; and cutting said substrate and optical waveguide layer into a predetermined dimension to manufacture a surface acoustic wave element.

* * * * *